US007272385B2

(12) United States Patent
Mirouze et al.

(10) Patent No.: US 7,272,385 B2
(45) Date of Patent: Sep. 18, 2007

(54) ACTIVATING AN INTERACTIVE MULTIMEDIA TERMINAL

(75) Inventors: Michel Mirouze, Verson (FR); Eric Depret, Caen (FR); Béatrice Parfait, Cormelles le Royal (FR); Yves Thorigne, Verson (FR)

(73) Assignee: France Telecom, Paris (FR)

( * ) Notice: Subject to any disclaimer, the term of this patent is extended or adjusted under 35 U.S.C. 154(b) by 606 days.

(21) Appl. No.: 10/311,863

(22) PCT Filed: Jul. 3, 2002

(86) PCT No.: PCT/FR01/02134

§ 371 (c)(1),
(2), (4) Date: Dec. 20, 2002

(87) PCT Pub. No.: WO02/07135

PCT Pub. Date: Jan. 24, 2002

(65) Prior Publication Data

US 2004/0023664 A1 Feb. 5, 2004

(51) Int. Cl.
*H04Q 7/22* (2006.01)

(52) U.S. Cl. .............................. 455/414.1; 455/414.2; 455/414.3; 455/41.2; 455/410; 455/411; 709/208; 709/217; 709/218; 709/219

(58) Field of Classification Search ................ 455/410, 455/411, 432-433, 419, 420, 418, 414.1, 455/414.3, 127.4, 352, 466, 41.2, 417, 414.2, 455/414.4, 426.1, 41, 432.1, 432.2, 41.3, 455/456.1, 456.2, 456.3, 456.4, 456.5, 456.6, 455/68, 415; 709/227, 217, 218, 219, 228, 709/229, 208; 705/1, 10, 14, 26, 50; 380/247, 380/248, 249, 250, 270
See application file for complete search history.

(56) References Cited

U.S. PATENT DOCUMENTS 6,055,512 A * 4/2000 Dean et al. .................. 705/17
6,188,898 B1 * 2/2001 Phillips ...................... 455/433
6,222,458 B1 * 4/2001 Harris ...................... 340/686.6
6,233,608 B1 * 5/2001 Laursen et al. ............. 709/217

(Continued)

FOREIGN PATENT DOCUMENTS

| | | |
|---|---|---|
| FR | 2 788 191 | 7/2000 |
| WO | WO98/36552 | 8/1998 |
| WO | WO 00/28762 | 5/2000 |

OTHER PUBLICATIONS

Min-Shiang Hwang, Yuan-Liang Tang, Cheng-Chi Lee, An efficient authentication protocol for GSM, 2000,IEEE IEEE/AFCEA , EUROCOMM 2000 pp. 326-329.*
Hua Zou, Bai Wang, Wenxin Mao, User profiles for access to telecom services, 1999, IEEE APCC/OECC '99, pp. 1114-1117.*

*Primary Examiner*—Joseph Feild
*Assistant Examiner*—Olumide Ajibade-Akonai
(74) *Attorney, Agent, or Firm*—Lowe Hauptman Ham & Berner LLP

(57) ABSTRACT

To activate an interactive multimedia station (BN) providing facilities of a mobile office to a user of a mobile radio terminal (TM), the mobile terminal (TM) signals its presence in the vicinity of the station (BN), either by local radio link to the station itself, or by short messages to a management server (SB) when the terminal is a radiotelephone. An identifier of the terminal is transmitted from the station (BN) to the management server, or to a location recorder of the radiotelephony network (RR) to activate the station after validating the identifier.

14 Claims, 6 Drawing Sheets

U.S. PATENT DOCUMENTS 6,259,914 B1 * 7/2001 Koster ..................... 455/432.1
6,275,692 B1 * 8/2001 Skog ....................... 455/414.3
6,334,152 B1 * 12/2001 Mannings et al. .......... 709/227
6,493,550 B1 * 12/2002 Raith ...................... 455/422.1
6,571,103 B1 * 5/2003 Novakov .................... 455/464
6,606,085 B1 * 8/2003 Endo et al. ................. 345/161
6,665,529 B1 * 12/2003 Mills, Jr. .................... 455/411
6,741,848 B2 * 5/2004 Timonen et al. ............ 455/405
6,754,504 B1 * 6/2004 Reed .......................... 455/517
6,766,160 B1 * 7/2004 Lemilainen et al. ........ 455/411
6,792,247 B2 * 9/2004 Law et al. ................. 455/41.2
6,892,052 B2 * 5/2005 Kotola et al. .............. 455/41.2
7,117,266 B2 * 10/2006 Fishman et al. ............ 709/217
7,136,999 B1 * 11/2006 Griffiths ..................... 713/168
2002/0022453 A1 * 2/2002 Balog et al. .................. 455/41
2002/0059434 A1 * 5/2002 Karaoguz et al. ........... 709/228
2002/0065099 A1 * 5/2002 Bjorndahl ................... 455/553
2002/0094787 A1 * 7/2002 Avnet et al. .................. 455/68
2003/0211845 A1 * 11/2003 Lohtia et al. ............ 455/414.3
2004/0157852 A1 * 8/2004 Peglion et al. .............. 455/403
2007/0037554 A1 * 2/2007 Freeny ....................... 455/410

* cited by examiner

ACTIVATING AN INTERACTIVE MULTIMEDIA TERMINAL

REFERENCE TO RELATED APPLICATION

This application is a continuation of the PCT International Application No. PCT/FR01/02134 filed Jul. 03, 2001, which is based on the French Application No. 00-09438 filed Jul. 13, 2000.

BACKGROUND OF THE INVENTION

1. Field of the Invention

The present invention relates generally to the activation of an interactive multimedia station by means of a mobile radio terminal.

2. Description of the Prior Art

At present, a mobile radio terminal is principally used as a telephone. The limited number of keys on the keypad of the terminal and virtually permanent recourse to use of the keypad, make the use of the terminal somewhat unergonomic for applications such as consulting information or messages in servers. Furthermore, the display of messages is limited by the small size of the screen of the terminal. For example, for videotelephony by means of the mobile telephone terminal, the small size of the screen thereof would seem to make it difficult to be used. Furthermore, as known, the transmission channel bandwidth in a radiotelephony network is narrow and restricts communications with the mobile terminal to relatively low bit rates, especially for data or video.

Furthermore, international patent application WO/0028762 describes a system for automatically handing-off a telephone call in a seamless manner from a mobile radio terminal that is already communicating via a first radiotelephony network to a base station serving a desktop computer with a fixed telephone. The base station is included in an in-building local radio network connected to the first network by an public switched telephone network (PSTN). When the terminal enters a determined office area around the base station, a proximity sensor senses the presence of the mobile terminal by means of an infrared link or other short-range link. The mobile terminal then sends an identification code to a switching center via the base station in the local network to initiate automatic hand-off of the call in progress to the computer, instead of the mobile terminal. Conversely, the call is handed off from the computer to the terminal when the latter leaves the determined area.

Furthermore, the presence of the handset equipping each street terminal is seen by most users as somewhat unhygienic.

There is therefore a need to provide means of overcoming the above drawbacks to offer mobile users functions that are more ergonomic than those offered by a simple mobile radiotelephone terminal but using the latter to access the functions.

Patent application WO 98/36552 proposes to make available to users carrying mobile radiotelephone terminals an information display unit that is connected to a user interface unit either directly or via a server transmitting text or other visual information. The user interface unit receives commands from a mobile radiotelephone terminal via the radiotelephone network of the terminal in which the terminal is included, identifies commands transmitted by the mobile terminal to the display unit, and also transmits commands to the server to select the information to be displayed on the display unit. Commands are transmitted to the display unit from the keypad of the mobile radiotelephone terminal, or in the form of spoken commands recognized by the mobile terminal.

The display unit disclosed in the patent application previously cited can be used only by a user who has a mobile radiotelephone terminal. An any user is unable to use the display unit since the display unit has no direct control means such as a keypad. Interaction between the user and the display unit is entirely visual.

To access the display unit, a user having a mobile radiotelephone terminal must go to the display unit, which displays a specific telephone number at all times when the unit is not busy, thereby entering the telephone number on the keypad of the terminal. The user interface unit answers the telephone call to the telephone number of the display unit in such a manner as to identify the latter with a view to sending it commands and initializing a session with the server.

This activation of the display unit requires a knowledge of the telephone number of the display unit and consequently a prior knowledge of the location of the display unit by the user, followed by movement of the user to a position facing the display unit so as to be able to read its telephone number thereon. In practice it is impossible for the mobile user to go quickly to a display unit, especially in the case of a mobile user who is located in an area in which the location of display units is unknown.

OBJECT OF THE INVENTION

The invention has as main object to provide an interactive multimedia station which can be activated following a call from a mobile radio without the user thereof having to know the telephone call number of the station.

SUMMARY OF THE INVENTION

Accordingly, a method of activating an interactive station connected to a telecommunication network, from a mobile radio terminal, is characterized by a signaling of the mobile terminal when it is in the vicinity of the station to a management means connected to the telecommunication network, or to the station itself, and by the transmission of an identifier of the mobile terminal from the station to the management means in order for station to be activated by the management means when the latter validates the identifier of the mobile radio terminal.

The activation of the station does not require the user of the terminal to know a radiotelephone number or an address of the station. For example, it suffices for the user to select an item in a main menu of his terminal to be directed to the nearest station or to communicate with the station directly.

In the context of the invention, the mobile radio terminal can be a mobile telephone terminal or any other portable object of the portable microcomputer or personal digital assistant type provided with short-range radio emitting-receiving means or a dual mode mobile terminal combining both a telephone and a short-range radiotelephone.

In a first embodiment, the mobile terminal is a mobile radiotelephone terminal in a radiotelephony network connected to the telecommunication network. This embodiment uses the ground environment of the radiotelephony network and particularly the short message service thereof. The signaling of the mobile terminal comprises the steps of :

- transmitting a short message comprising the identifier of the terminal and a location area identifier from the radiotelephony network to the management means, locating the terminal in the location area, searching in the management means for at least one of the interactive stations nearest the located terminal, transmitting location coordinates of the nearest station from the management means to the terminal to display the location of the station, and transmitting a message from the management means to the nearest station for prompting to enter the identifier of the terminal.

In a second embodiment, we can supply initially to the mobile terminal and to the interactive station, respective means for exchanging data over a radioelectric link having a local radio coverage area, for example of a few tens of meters. The signaling of the mobile terminal comprises the steps of:

periodically scanning for the presence of a mobile terminal in said radio coverage area of the station, signaling the presence of the terminal in the coverage area from the terminal to the station in order that the terminal declares an access profile type, and transmitting of a message from the station to the terminal to prompt the terminal to send the identifier of the terminal to the management means through the station.

The mobile terminal can be a dual mode terminal both for radiotelephony communications with a radiotelephony network connected to the telecommunication network, and for communications with the station over said radio link whose frequency band is preferably higher than that of the radiotelephony network.

The management means can be included at least in part in a home nominal location means of the mobile telephone network.

In a second variant, the mobile terminal is a short-range radio terminal with a range of a few tens of meters, such as a personal digital assistant or a portable microcomputer.

Regardless of its type, the station is activated, following validation of the identifier of the terminal by the management means, as a function of personalization of the functions of the station by means of a user profile associated with the validated identifier of the terminal and transmitted from management means, which can be a home location register of the mobile telephone network or a server managing the stations and connected to the telecommunication network.

Preferably, an authentication of the user of the terminal by the management means is provided prior to personalization of the functions of the station.

The station according to the invention delivers a range of interactive telecommunication services to any user standing in front of it. The station is accessible to the user either directly, like a conventional station, or via a mobile terminal. The range of services offered covers in particular standard telephone and videotelephone services and consultation of servers, in particular internet and electronic mail servers. The above list is not exhaustive, and can be expanded by adding new services made available on telecommunication networks.

Use of the station primarily meets the requirements of mobile persons who wish in particular to obtain access to telecommunication services that are equivalent to, or even enriched compared to, those of which they have the benefit in their office, for example.

The invention relates thus to an interactive station comprising at least a display means, characterized in that it comprises means to be activated from a mobile radio terminal according to the method of the invention.

For a mobile radio terminal user, the station serves as an interactive terminal offering a broad range of services with significantly improved ergonomic features compared to those offered by mobile terminals. Thus consultation of an information server is particularly improved by the use of the station compared to a mobile terminal. The user has the benefit of a familiar environment. Interactivity becomes natural thanks, firstly, to using keys on a touch-sensitive screen and, secondly, to the quality of the screen, which reproduces, by improving it, the facilities offered by standard screens, such as those of microcomputers. This ergonomic feature is further improved by means for adjusting the directivity of audio means included in the station.

The station provides access to high bit rate telecommunication networks, accommodating changing services necessitating high information bit rates. Access to various telecommunication networks is in no way dedicated. Thus the station can accept new services according to their availability and the expectations of users.

In addition to providing a range of telecommunication services, the station behaves like a multiple use terminal. On the one hand, this station plays the role of a fixed intelligent terminal for telecommunication services, but it can also display advertising or local interest information. This second facility is available even when the station has not been activated by a user.

BRIEF DESCRIPTION OF THE DRAWINGS

Other features and advantages of the present invention will become more clearly apparent from the reading of the following description of several preferred embodiments of the invention, with reference to the corresponding accompanying drawings, in which.

DESCRIPTION OF THE PREFERRED EMBODIMENTS

Figure 1:
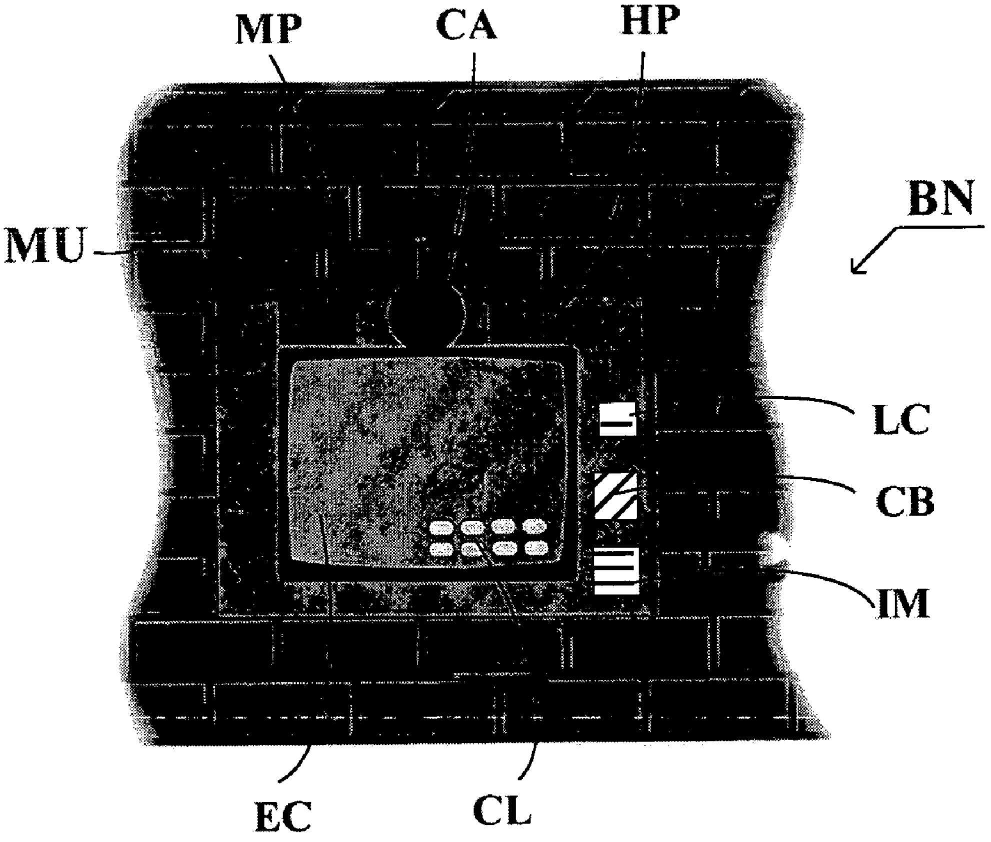
FIG. 1 is a front view of an interactive multimedia station according to the invention integrated into a wall.
Figure 2:
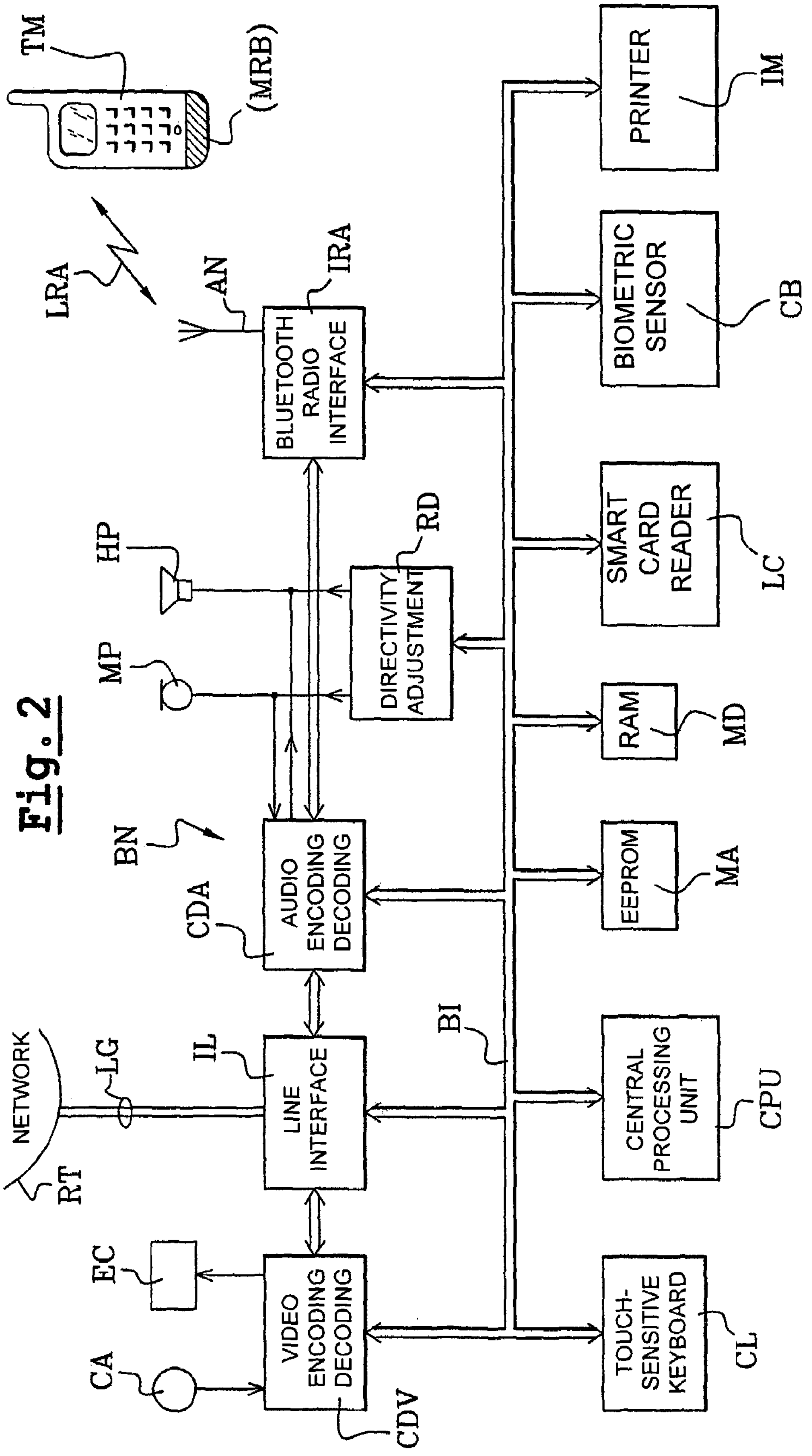
FIG. 2 is a schematic block diagram of the station valid for all the embodiments described hereinafter.

A complete embodiment of an interactive multimedia station BN according to the invention is shown diagrammatically in FIG. 1 as regards the facilities of the station visible to users and in FIG. 2 as regards the internal functional architecture of the station.

As shown in FIG. 1, audiovisual means can be integrated into a wall, for example the wall of a kiosk, the outside wall of a building, or a wall inside premises. For example, the station is installed in busy places such as stations, shopping malls, hotels, post offices, etc. The audiovisual means include audio means including at least one directional microphone MP and at least one directional loudspeaker HP, and video means essentially including a display unit screen EC with a touch-sensitive keypad CL and a camera CA. The keypad is preferably associated with a navigation key or a control ball such as a "trackball" for making selections from menus on the screen of the station.

Because they are directional, the audio means MP and HP enable individual dialogue between a user standing in front of the station BN and this station. In the case of telephone communication when the audio means of the station are in the active state, the user is sensitive to the confidentiality of the conversation, which can therefore be listened to only at a low volume. The station BN advantageously includes a directionality adjustment circuit RD for adjusting the directionality of the audio means MP and HP as a function of the physical characteristics of the user and in particular the size of the user and his position in front of the station. The directionality of the audio means is adjusted either by keys of the keypad CL or by voice recognition means which detects voice commands transmitted from the microphone MP.

The display unit of the screen EC is similar to the high-resolution display unit of a personal computer, so as to show clearly images in three dimensions. The keys of the keypad CL are used to adjust the display of images on the screen. The camera CA picks up images of the user standing in front of the station in order to transmit them to a distant party and thus to use the station as a videophone.

As also shown in FIG. 1, the station BN optionally includes user authentication means in the form of a reader LC for reading a smart card, also known as microcontroller cards, with or without contact, for example telephone cards, bank cards or electronic purses. The user authentication means can optionally include, in addition to or instead of the card reader LC, a biometric sensor CB, for example a fingerprint sensor or an iris sensor. The station is preferably further equipped with a printer IM so that a user can take away a hard copy of a screen page.

The station therefore offers multiple interactive functions to a user, whether or not the user has a portable radio terminal, reproducing the functions and ergonomic features of an office automation terminal.

As shown in FIG. 2, the station BN is organized around a central processing unit CPU comprising at least one processor conventionally connected by an internal system bus BI to a nonvolatile memory MA of EEPROM or SRAM type containing applications in particular for activating and personalizing the station according to the invention, and to a data memory MD of type RAM for storing data exchanged with the world outside the station, including servers and mobile terminals, in particular via the keypad CL, a line interface IL, and a radio interface IRA. The internal bus BI also serves the touch-sensitive keypad CL, the card reader LC, the biometric sensor CB, the printer IM, and the interfaces IL and IRA. The central unit CPU is therefore connected by the bus BI to a display unit video encoding-decoding circuit CDV connected directly to the interface IL and to an audio encoding-decoding circuit CDA connected directly to the interfaces IL and IRA.

The line interface IL connects the station BN to a transmission line LG and is matched to a termination in the local exchange of the network associated to the line LG. For example, the line interface IL conventionally comprises a modem, preferably a high-rate modem which digitally multiplexes sound and image data, an ISDN (Integrated Services Digital Network) modem, or an ADSL (Asymmetric Digital Subscriber Line) modem.

The radio interface IRA for a station conforming to the second embodiment of the invention has an antenna AN so that it can be connected at least one mobile radio terminals TM of a user, for example a dual mode mobile radiotelephone, a personal digital assistant PDA, or a portable microcomputer fitted with a radio transmitter-receiver module MRB, by a short-range radio link LRA providing local radio coverage area, typically conforming to the DECT (Digital Enhanced Cordless Telecommunications) standard, or the Bluetooth technology, to which reference will be made by way of example hereinafter. The radio interface IRA splits the radio signals sent and received, transposes in frequency, and converts them according to an analog way and a digital way.

The audio encoding-decoding circuit CDA digitally encodes audio signals picked up by the microphone MP to send them to the transmission line LG via the interface IL or to the radio link LRA via the interface IRA and decodes digital signals received from the line LU or the link LRA to send them to the loudspeaker HP. The circuit CDA also includes voice recognition means for encoding voice commands from the user picked up by the microphone MP instead of commands input via the keypad CL. The directivity adjustment circuit RD is connected between the audio encoding-decoding circuit CDA and the combination of the microphone MP and the loudspeaker HP.

The video encoding-decoding circuit CDV primarily compresses the digital image signal delivered by the camera CA to send a compressed image signal over the user line LG via the interface IL and conversely decompresses a compressed image signal received over the line LG via the interface IL, for example in order to display images of a distant party on the screen EC. The circuit CDV also participates in adjustment for displaying the images on the screen by means of the keypad CL or the circuit CDA. As seen hereinafter, for example, the screen EC is used to display information outgoing from a server SD that the user has requested via the station BN.

A first embodiment and a first variant of a second embodiment of the method of activating an interactive multimedia station BN are described hereinafter on the assumption, by way of example, that a mobile radio terminal TM has the essential functions of a standard GSM 900, DCS 1800 or UMTS (Universal Mobile Telecommunication System) mobile radiotelephone terminal. For greater concreteness, the remainder of the description refers to the infrastructure of a mobile radiotelephone network RR according to GSM standard. It is also assumed that, during activation, the user of the terminal TM prefers to use the audio means, microphone and earpiece, of the mobile terminal TM, so that the station BN offers the user as a minimum configuration the screen EC and the keypad CL, with reference to FIG. 1.

Figure 3:
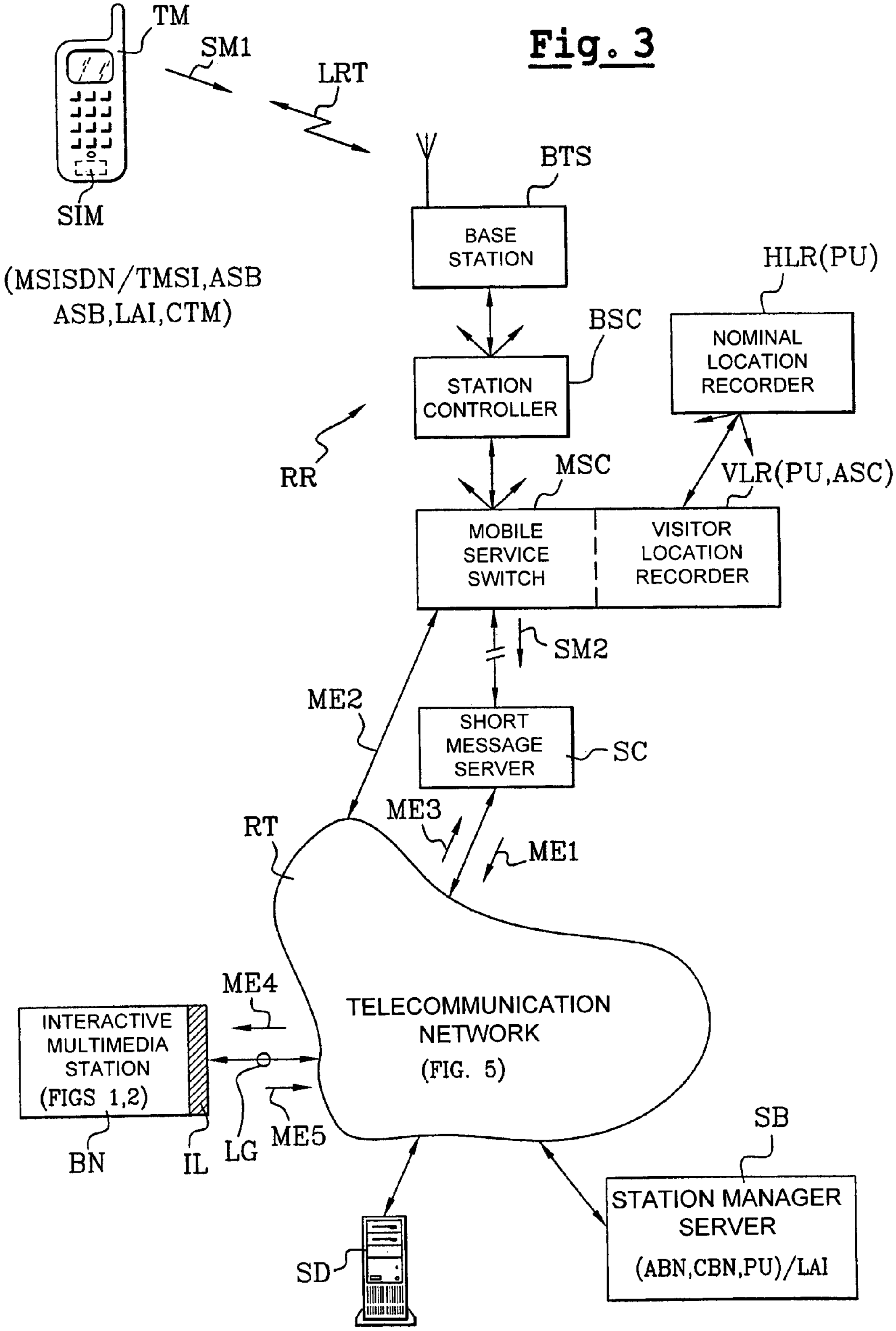
FIG. 3 is a schematic block diagram of the link between a mobile radiotelephone terminal and the station via a short message server and a station manager server conforming to a first embodiment of the invention.

In the first embodiment shown in FIG. 3, the station BN is activated by an SMS (Short Message Service) service which enables exchanges of short messages between the mobile telephone terminal TM and an entity external to the cellular mobile network RR of the terminal TM. The external entity is a station manager server SB which is connected to one of the short message servers SC (Short Message Service Center) associated with the cellular radiotelephony network RR.

The short message server SC is connected to at least one mobile service switch MSC included in the fixed network of the mobile telephone network RR, either directly or via an X.25 or ISDN type intermediate network.

FIG. 3 shows diagrammatically and by way of example the main means of the GSM telephony network RR, connecting the mobile radiotelephone terminal TM at any given time to the short message server SC. The main means comprise a current base station BTS serving by means of a radiotelephone link LRT the current cell in which the mobile terminal TM is currently located, a base station controller BSC, and the mobile service switch MSC already cited. The switch MSC is associated with a visitor location register VLR which manages at least one location area of the network RR comprising a few cells to a few tens of cells and stores profiles of users temporarily in that area.

Figure 5:
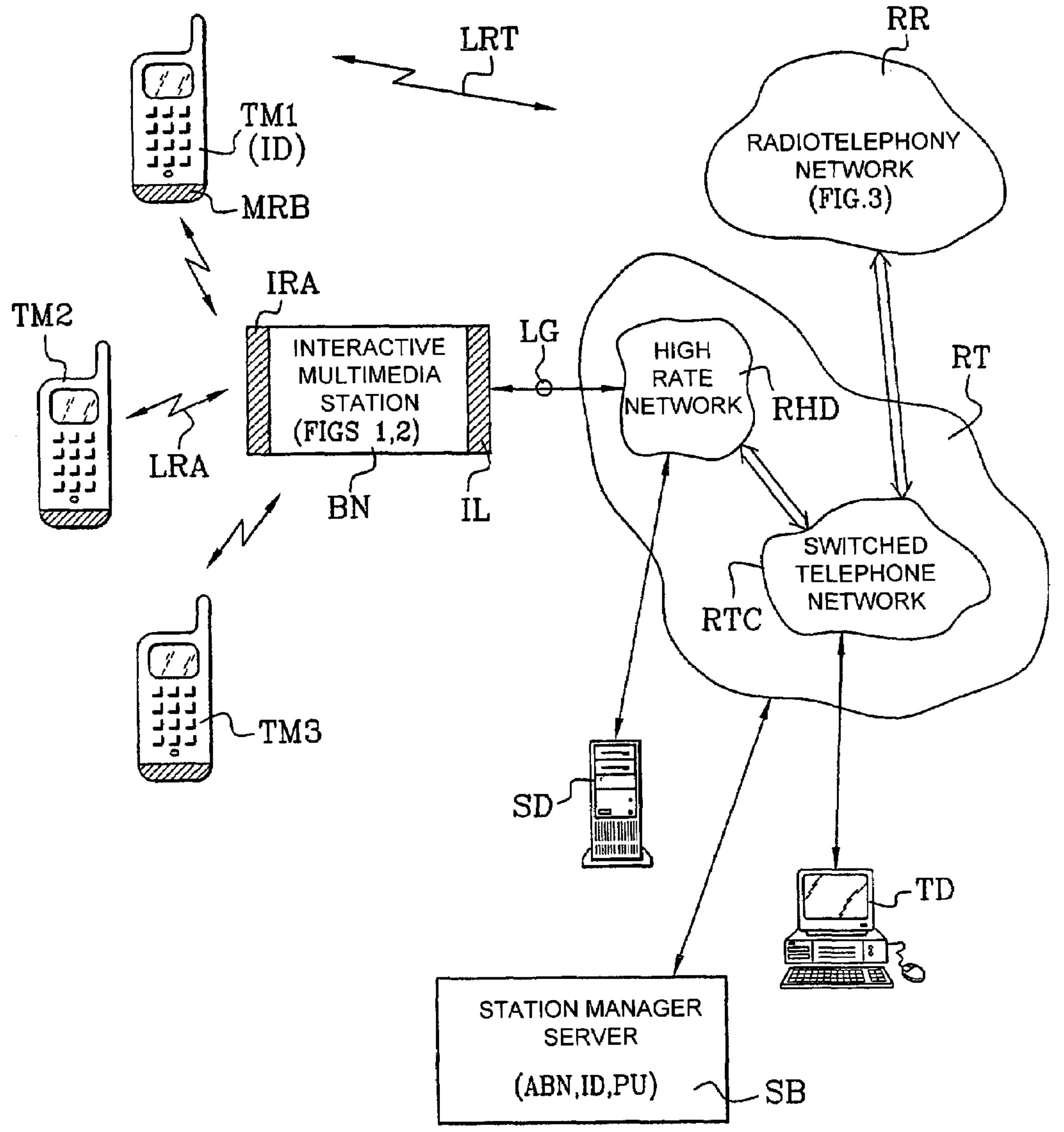
FIG. 5 is a schematic block diagram of the link of a plurality of mobile radio terminals to a station conforming to a second embodiment in accordance with the invention for activating the station.

A telecommunication network RT also shown diagrammatically in FIG. 3 connects the station BN, the fixed part of the radiotelephony network RR, and the station manager server SB. The network RT generally incorporates any kind of telecommunication network including at least a switched telephone network RTC and a high rate network RHD of internet type, as shown in FIG. 5.

The station manager server SB contains a database listing addresses ABN of the stations BN as a function of their geographical coordinates CBN, latitude and longitude, in the territory covered by the radiotelephony network RR, and to be more precise as a function of the location areas of the network RR. The station manager server SB also contains user profiles PU relating to users who have recently used stations BN, associated with the addresses ABN of the latter.

Figure 4:
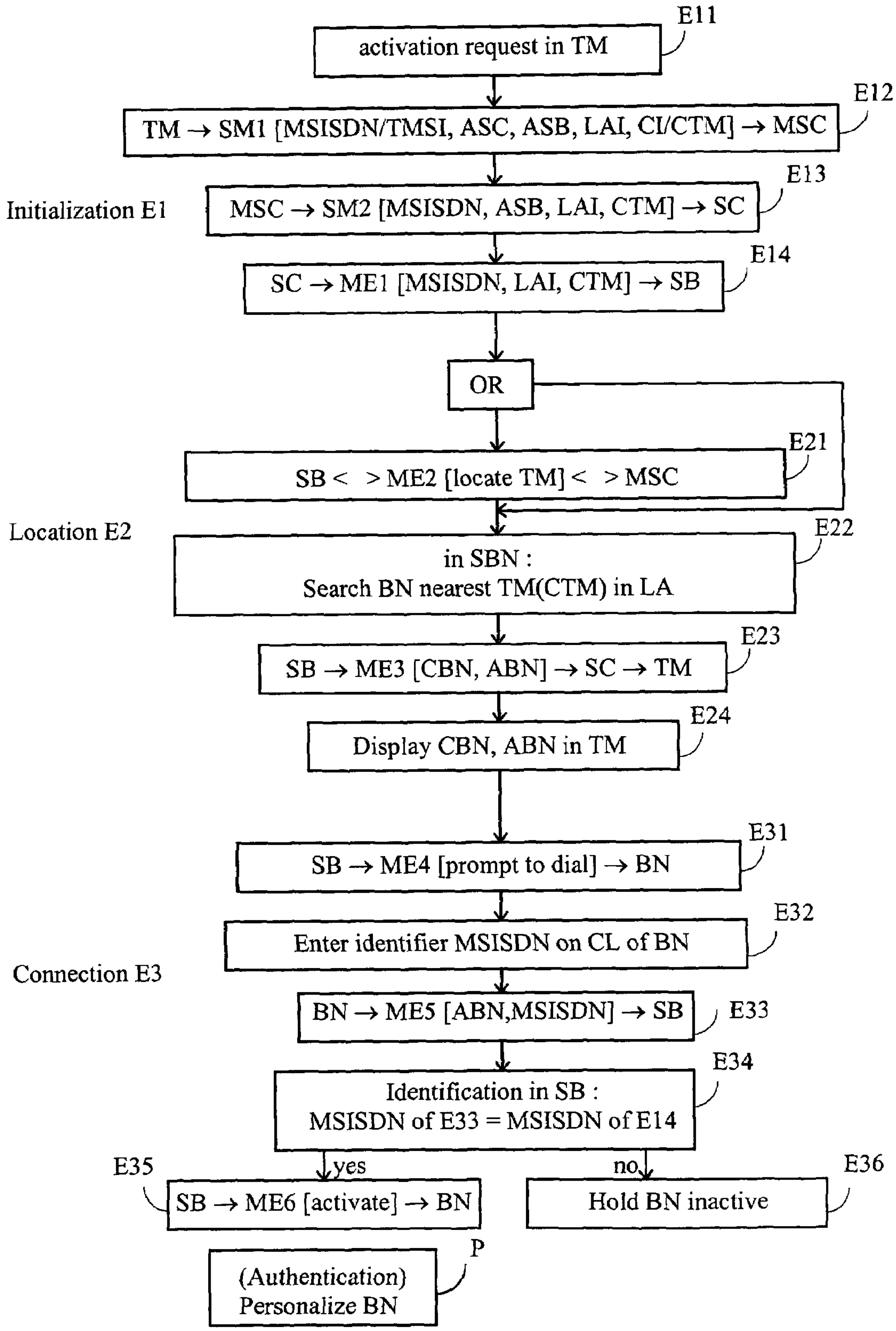
FIG. 4 shows an algorithm for activating the station conforming to the first embodiment.

In the first embodiment, activation of the station BN from the mobile telephone terminal TM essentially comprises three main steps, namely an initialization step E1, a step E2 of locating the mobile terminal, and a step E3 of connecting the terminal and the station, each of these steps comprising substeps as shown in FIG. 4.

As is known in the art, the mobile telephone terminal TM contains a removable user identity card SIM (Subscriber Identity Module) whose nonvolatile EEPROM stores features of the profile of the user, including the mobile user international number MSISDN (Mobile Station ISDN Number), the temporary identifier TMSI (Temporary Mobile Station Identity) allocated to the terminal TM by the visitor location register VLR, the location area identifier LAI (Location Area Identification) in the network RR in which the mobile terminal TM is temporarily located and which is covered by the base stations connected to the switch MSC, and an address ASB of the station server SB. The SIM card does not contain any indication relating to the identity of an interactive multimedia station BN according to the invention.

To request activation of an interactive multimedia station from the terminal TM, the user presses a specific key on the keypad of the terminal or selects a multimedia station activation item from a main menu in a substep E11. In this regard the SIM card is proactive in order to initialize actions in the mobile terminal TM and establishes proactive commands encapsulated in responses known as the SIM Application toolkit.

After this activation request, the terminal TM derives and sends to the mobile service switch MSC a short message SM1 containing a source address in the form of the temporary identifier TMSI or the mobile user number MSISDN, a destination address in the form of the address ASC of a short message server SC and the address ASB of the station server SB, and the location area identifier LAI, in a substep E12. The user profile PU of the user is consulted in the register VLR in response to the message SM1 to substitute for the temporary identifier TMSI received in the message SM the user's telephone number MSIN (Mobile Subscriber Identification Number) or MSISDN (Mobile Station ISDN Number), if the latter is not included in the message SM1, and extract the short message server address ASC for the switch MSC to derive a second short message SM2 containing at least the parameters MSISDN, ASB and LAI in a substep E13.

The server address ASB is extracted from the message SM2 received by the short message server SC to transmit a message ME1 containing the number MSISDN and the location area identifier LAI to the station server SB in a substep E14.

In the main step E2, the station server SB attempts to locate the terminal TM in the location area identified by the identifier LAI in order to direct the user of the terminal TM toward one of the nearest interactive multimedia stations BN in the identified location area.

In a first variant of the location process, each base station of the network RR also broadcasts a cell identifier CI (cell identity) in the location area LA. The terminal TM also introduces the cell identifier CI corresponding to the current base station BTS into the short message SM1. The register VLR associated with the switch MSC serving the current base station BTS extracts the cell identifier CI in order to match to it the geographical coordinates of latitude and longitude for the current base station BTS which, in this first embodiment, are deemed to be the approximate geographical location coordinates CTM of the terminal TM. The coordinates CTM are also inserted into the short message SM2 by the switch MSC and then into the message ME1 by the server SC, and are extracted from the received messages ME1 by the station manager server SB. Thus the mobile terminal TM is located as a function of the identifier CI of the current cell in which the mobile terminal is currently located and thus of the geographical coordinates of the base station of the mobile telephone network with which the mobile terminal is communicating.

Knowing the identifier received from the location area LAI, the server SB consults in a database the list of the stations BN in the location area to compare their geographical location coordinates CBN with the coordinates CTM of the terminal TM previously determined in a substep E22. The geographical coordinates CBN and/or the address ABN of the nearest station BN are introduced into a message ME3 addressed to the short message server SC, which forwards them in the form of short messages to the terminal TM in a substep E23. Then, in a substep E24, the terminal displays the coordinates CBN and/or the address ABN of the nearest station. In practice, the coordinates CBN can be displayed at the level of the local situation of the station and the terminal, and/or the displayed address ABN includes the number, the street and the town at which the station BN is located and the address ABN, possibly together with a telephone number or an IP address of the station in the internet network.

Alternatively, instead of transmitting the geographical coordinates and the address of the nearest station BN, the station manager server SB transmits location coordinates, such as addresses, of two or three interactive multimedia terminals nearest the terminal TM in the message ME2 so as to display all these parameters and to leave it up to the user to make his way to one of the stations and activate it.

In a second variant of the location process, the mobile terminal TM is located by location triangulation, i.e. by measuring the signal power and propagation time in each of three adjoining base stations in the identified location area, including the current base station. The three base stations are selected from a list associated with the current base station and have a level of power sufficient to maintain a call in the terminal. The distances between the terminal and the three selected base stations are calculated in the switch MSC whose the current station depends on. The geographical location coordinates CTM of the mobile terminal TM determined for longitude and latitude in the switch MSC in this way are requested and collected by the station manager server SB by exchanging messages ME2 with the switch MSC in a substep E21 between substeps E14 and E22.

In a third variant of the location process, instead of locating the mobile terminal TM geographically in the current base station, the mobile terminal TM itself determines its location by triangulation, i.e. by measuring the power levels at which it receives from the current base station and the two adjoining base stations having the highest power levels and collecting the geographical coordinates of the three base stations thanks to periodic broadcasting of the geographical coordinates of the base stations of the location area LA on a predetermined channel sent periodically by the current base station, for example the channel BCCH (broadcast control channel) according to GSM standard. In s this variant, the terminal TM introduces itself the geographical coordinates CTM into the short message SM1 in the substep E12. In the substep E14, the station server SB extracts from the message ME1 the coordinates CTM of the terminal with the location area identifier LAI in order to search for the stations nearest the terminal TM in the substep E22, which is followed by the substeps E23 and E24.

In a fourth variant of the location process, the geographical coordinates CTM of the terminal TM are determined by means of the geostationary satellite guidance system known as the system GPS (Global Positioning System), which is integrated into the mobile terminal TM. That system also supplies the geographical coordinates CTM so that the terminal TM itself introduces them into the message SM1 in the step E12, which is therefore processed as in the third variant of the location process.

In all of the above variants of the location process, if no station is located in the identified area LA the server SB transmits an error message to the mobile terminal TM via the server SC in order to repeat the activation request at least one time or to prompt the user to move into an area likely to contain at least one interactive multimedia station.

After the substep E24, the station manager server SB prompts the user to dial the identifier of the terminal TM at the nearest station, or in one of the nearest stations according to a variant, by transmitting a prompt-to-dial message ME4 to the nearest stations that are inactive, i.e. available for an interactive session with the user. The content of the message ME4 is displayed on the screen EC of these terminals in a substep E31. Using the touch-sensitive keypad CL of the nearest station or one of the nearest stations, the user enters the terminal identifier, for example the telephone number MSISDN, in a substep E32. Then, in the substep E33, the station BN transmits a message ME5 containing the number MSISDN to the station server SB, which, in a substep E34, compares it to the number MSISDN stored previously and extracted from the message ME1. If the two numbers compared are identical, the station manager server SB validates the identifier MSISDN and transmits a station activating message to the station BN in the substep E35 so that the user can use the terminal after user authentication and terminal personalization as seen below.

Otherwise, the server SB prompts the user to enter his number MSISDN again on the keypad CL of the station BN and holds inactive the station BN after two or three unsuccessful attempts to enter the number.

The radio interface IRA of the station BN shown in FIG. 2 is not used to carry out activation stations in accordance with the first embodiment previously described with reference to FIG. 4. The station is thus activated by way of the radiotelephony network RR and the server SB, with no direct link to the mobile terminal TM.

In the second embodiment of the station activating method according to the invention, the radio interface IRA can communicate via a radio link LRA using the Bluetooth wireless communication technology, the mobile terminal TM including a small Bluetooth radio emitter-receiver module MRB. The module MRB includes a radio interface and a microcontroller sharing the man-machine interface of the terminal TM comprising the display, the keypad and the audio circuit, with the microcontroler managing radiotelephone calls with the network RR. In the first variant of the second embodiment, the terminal TM is a dual mode mobile radiotelephone terminal, for example, able to communicate either via the cellular radiotelephony network RR or via the short-range radio link LRA, or, in a second variant of the second embodiment, a mobile radiotelephone terminal of the portable microcomputer, personal stereo or personal digital assistant type including the module MRB and communicating only via the short-range radio link LRA. The short-range radio link LRA can be of the DECT type or of the Bluetooth type, and the latter type is referred to by way of example hereinafter.

The Bluetooth mode is selected in the mobile terminal TM by pressing a dedicated key or by selecting an item from the main menu displayed on the screen of the terminal and including both the transmission modes previously cited.

The Bluetooth radio transmission mode relates to a radio link in a narrow frequency band typically centered on a frequency of 2.45 GHz, significantly higher than the frequency band for the radiotelephony network RR, with short-range radio coverage of less than approximately 50 or 100 meters for a power level of approximately 20 dBm transmitted by the station. The Bluetooth link LR transfers data, including digitized voice data, at a bit rate of 721 kbit/s in the downlink direction from the station BN to the terminal TM and a lower bit rate of 57 kbit/s in the uplink direction from the terminal TM to the station BN, for example. The link LRA supports simultaneously a plurality of multiplexed data communication digital channels in each transmission direction between I mobile terminals TM1 to TMI situated in the vicinity of the station and the station BN, as shown diagrammatically in FIG. 5. The integer I is typically equal to 7. Furthermore, of the I digital channels, plural telephone communication channels between J mobile terminals and the station BN, with $J<I$, typically $J=3$, can be supported simultaneously by the radio link LRA to provide simultaneous telephone calls between mobile terminals and the switched telephone network RTC via the station BN.

One of the main advantages of the Bluetooth link LRA is the ability of the terminals TM1 to TMI to communicate directly via a short-range radio link with the station BN, without passing through any telecommunication network, such as the network RR, and without needing to remain in direct line of sight of the station, as is the case for infrared transmissions, enabling movement of the mobile terminals in front of the station.

Activation of the station BN in order to set up a call on one of the digital channels of the link LRA with one of the mobile terminals TM1 to TMI, hereinafter designated TM, is described below with reference to FIGS. 6 and 7. During this activation, the station BN serving as a local device is the master in terms of taking the initiative for the connection, and the mobile terminal TM, serving as the remote device, or any other portable electronic telecommunication device conforming to the Bluetooth standard, is the slave. During activation, there is no interactivity between the screen EC and the touch-sensitive keypad CL of the station BN and the user via the mobile terminal TM.

Activation of the station BN by the mobile radio terminal TM comprises steps S1 to S9. Initially, at least one of the digital communication channels is available, the station BN periodically scans for the presence of a mobile telephone TM in a radio coverage area with a radius of a few tens of meters, and the terminal TM has selected the Bluetooth transmission mode, as indicated in step S1 in FIG. 6. Thus the station periodically sends an inquiry and, if the user has selected the Bluetooth mode on the terminal TM, the terminal TM signals its presence as soon as the terminal enters the radio coverage area of the station BN, if it is not there already. To signal its presence, the terminal sends a response to the inquiry in the next step S2 as soon as it has recognized the inquiry. In the subsequent steps S2 to S5, the mobile terminal TM then connects to the station BN in accordance with an access profile prestored in the microcontroller relating to the Bluetooth mode in the terminal and defining a message protocol. This access profile (Generic Access Profile) is declared to the station and conditions a call between the station and the terminal. The memory MA of the station BN has previously stored all the terminal profiles. For example, if the mobile radio terminal is really a cordless telephone, the profile is appropriate to a cordless telephone, in this instance a dual mode radiotelephone terminal as defined above, whereas if the mobile radio terminal is a portable object such as a microcomputer or a portable assistant, the profile incorporates a file synchronization service, for example. Accordingly, the terminal TM, when activated to discover a station, is in a search mode (Discoverable Mode) in step S2 to accept a request for connection via the station.

On receiving the response to the inquiry, the station BN sends a paging message in step S3. Then, in step S4, the terminal TM sends a paging response declaring its access profile type, which confirms to the station that the terminal wishes to set up a connection with the station in accordance with that profile. In the next step S5, the station BN sends a prompt-to-send (Pool) message for the terminal TM subsequently to set up and send a data message.

Figure 6:
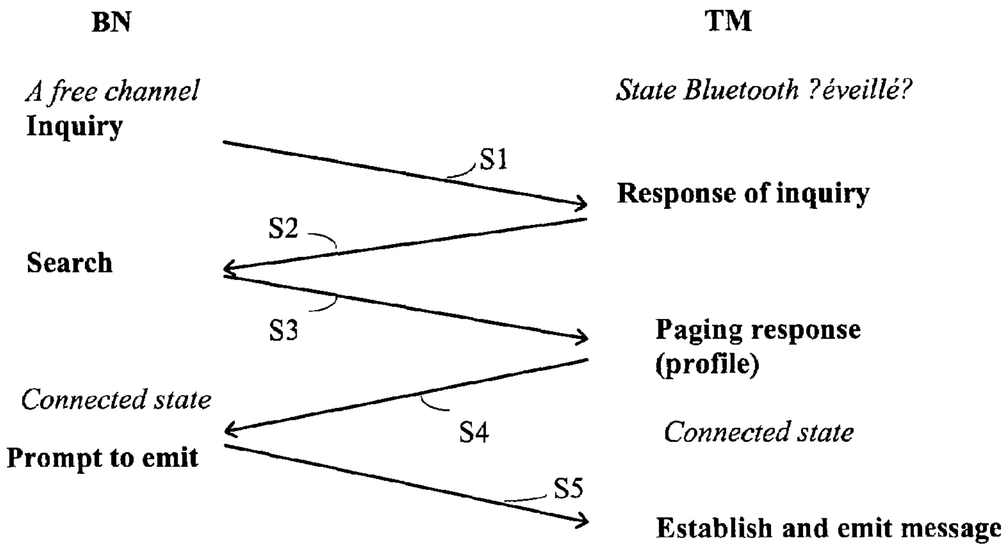
FIGS. 6 and 7 show algorithms for setting up connections and requesting transfers of data conforming to the second embodiment of the method in accordance with the invention of activating the station.
Figure 7:
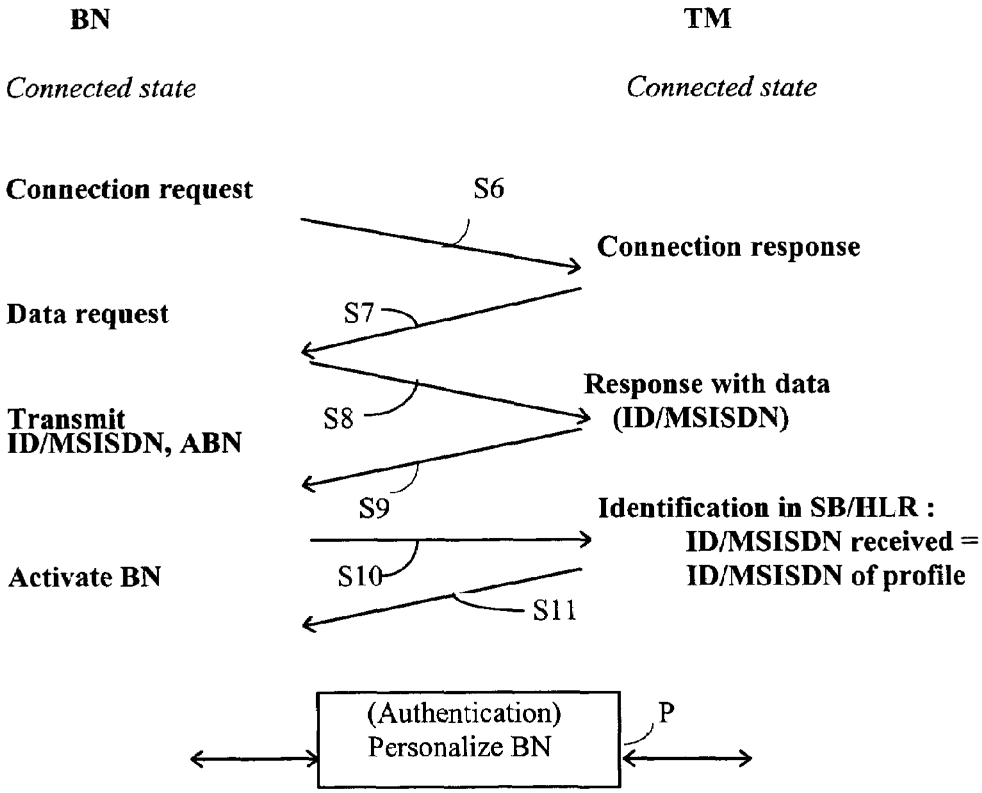

The dialogue for setting up the connection and transferring data between the station BN and the terminal TM as shown in FIGS. 6 and 7 employs a SDP service discovery protocol that is implemented in the processing unit CPU of the station and in the microcontroler s managing the Bluetooth radio module MRB in the mobile terminal TM.

After the link set-up procedure described with reference to FIG. 6, the terminal TM transfers data to the station BN. For this transfer, the station and the terminal support generic object exchange profiles and file transfer profiles for transferring one or more files from the terminal to the station. At least one file from the terminal is transferred to the station to access the service provided by the station.

As shown in FIG. 7, transferring a data file from the terminal TM to the station comprises the following steps S6, S7 and S8. The station BN and the terminal TM being in the connected state after the set-up procedure shown in FIG. 6, the station BN sends a connection request over the link LRA to the terminal TM in step S6. The terminal TM then sends a connection response in step S7 for the station BN to prepare a data request (Get Request) including a definition of various parameters that the terminal must retransmit, including an identifier of the terminal. Accordingly, in step S8, in response to the data request, the terminal TM sets up and sends a response message including the various parameters requested and the data of the file to be transferred.

The parameters transferred from the mobile terminal TM to the station BN include at least a user identifier ID in read-only memory of the terminal TM, which may be the same as the user international identifier IMSI (International Mobile Subscriber Identity) and/or the international telephone number MSISDN of the user if the mobile terminal is a dual mode radiotelephone terminal. The user identifier ID matches the user to a service profile defining one or more services to which the user requires access at the station, depending on his user profile PU when he entered into an agreement with the operator managing the interactive stations.

In step S8, following the prompt-to-send data, such as the identifier ID, the IMSI, and the MSISDN, the station BN receives the identifier from the terminal TM in step S9 and retransmits it with its address ABN to management means via the telecommunication network RT in step S10. As a general rule, for all of the terminals, the management means consist of the station manager server SB already described with reference to FIG. 3. However, for mobile terminals that have communicated an access profile for radiotelephone terminal to the station, the station instead retransmits the identifier to the home location register HLR of the radiotelephony network RR.

The station manager server SB or the register HLR verifies that the user identified in this way, and preferably authenticated in the manner explained below, has the right to access services via the station BN, as in step E34 in the first embodiment. Having validated the identifier received from the terminal TM via the station, the server SB or the register HLR transmits an activation message to the station BN in step S11.

After the connection step E3 of the first embodiment shown in FIG. 4, or after the data transfer steps S6 to S10 of the second embodiment shown in FIG. 7, the user of the terminal TM is authenticated, in addition to comparing the identifier ID or IMSI or MSISDN attached to the terminal in step E34, S10, for example by means of a more personalized identifier of the user, such as the secret code of a memory card of the user which is already stored in the user profile PU in the server SB or the register HLR and which is read from a smart card inserted into the reader LC of the station BN in step E32 of the first embodiment or in step S9 of the second embodiment. Similarly, the user of the mobile terminal TM can be authenticated by comparing a biometric print already stored in the user profile PU in the register HLR with a biometric print of the user sensed via the biometric sensor CB of the station BN.

Following authentication, the data representing the types of service required by the user is transferred by the server SB or the register HLR to the station to personalize the functions thereof. It is recalled that the user has been identified by the identifier ID or MSISDN or IMSI transferred by the mobile terminal TM to the station BN in step E34 in the first embodiment and in step S10 in the second embodiment.

Personalization P of the station BN is then instigated by the management means, i.e. the station manager server SB and/or the home location register HLR of the radiotelephony network RR, after the identifier is validated in step E34 or S11. In particular, the server SB or the register HLR verifies that the user recognized by his identifier ID, IMSI or MSISDN has entered into an agreement to use interactive multimedia stations according to the invention, and retransmits to the station BN the user profile PU corresponding to the user's agreement, to personalize the station.

As a general rule, the most comprehensive agreement corresponds to transformation of the station into an interactive terminal in order to offer all the functions of a mobile office.

The station is configured in accordance with personalization data read in the user profile PU and which includes, for example:

"shortcuts" to parties called most frequently, preferred sites, in particular internet sites, office automation applications used most frequently, etc.; access to these various services is respectively indicated by icons on the screen EC of the active station BN, for example;

lists of favorite addresses URL (Universal Resource Locators) accessible via a browser implemented in the station BN, or via an application driving the browser;

directories of all parties on a telephone network and/or dedicated networks or the internet, subdirectories of which can be accessed directly by applications respectively communicating with the telephone network, the dedicated networks or the internet;

directories of electronic mail addresses; and lists of office automation applications authorized by the user's agreement profile PU.

Furthermore, the station BN holds in its memory MD a personal memory space for the user to store various documents, files and personal messages. These are preferably organized into a tree structure to enable the user to click on a document, file or message to launch a corresponding application for processing it, in an analogous manner to word processor, spreadsheet, etc. applications on a personal computer. Any office automation application is preferably downloaded into the station from a server dedicated to the stations as a function of the frequency of use of an application, for example, or is resident in the station until it is deactivated by the user.

Following configuration as described above, the user uses the means in the station defined by his profile to communicate with a chosen called terminal TD or a chosen called information server SD.

The invention claimed is:

1. A method of activating, from a mobile radio terminal having a prestored access profile type and located in a cellular mobile network, an interactive station coupled to a telecommunication network that is coupled to said cellular mobile network, said mobile terminal and said interactive station being arranged for exchanging data over a local radio link providing a local radio coverage area, said interactive station from time to time scanning for the presence of said mobile terminal in said local radio coverage area, said method including the following steps after said mobile terminal signals its presence in said local radio coverage area to the interactive station:

declaring said prestored access profile type by said mobile terminal to said interactive station through said local radio link without passing through said cellular mobile network so that said access profile conditions a communication between said interactive station and said mobile terminal, prompting said mobile terminal to send an identifier of said mobile terminal to said interactive station by transmitting a message from said interactive station to said mobile terminal through said local radio link, and transmitting said mobile terminal identifier from said interactive station to a management arrangement through said telecommunication network so that (a) said management arrangement activates said interactive station, and (b) functions of said interactive station are personalized according to a user profile associated with said mobile terminal identifier and transmitted from said management arrangement to said interactive station through said telecommunication network in response to said management arrangement validating said mobile terminal identifier.

2. A method according to claim 1, wherein said mobile terminal is a dual mode terminal both for radiotelephone communications with a radiotelephony network connected to the telecommunication network and for communications with said station over said radio link whose frequency band is higher than that of said radiotelephony network.

3. A method according to claim 2, wherein said management arrangement is included at least in part in a home location register of said radiotelephony network.

4. A method according to claim 1, wherein said radio link supports simultaneously a plurality of telephone communication channels between a plurality of mobile terminals and said station. Conversely, the call is handed off from the computer to the terminal when the latter leaves the determined area.

5. A method according to claim 1, wherein said radio link supports a plurality of data channels between a plurality of mobile terminals and said station.

6. A method according to claim 1, wherein said management arrangement is dedicated to management of a plurality of interactive stations and to management of user profiles that match respectively to a plurality of mobile terminals rights to access to predetermined services accessible via said interactive stations.

7. A method according to claim 1, including authenticating a user of said mobile terminal by said management arrangement before personalizing said station functions.

8. A method according to claim 7, wherein said authentication includes reading a secret code from a smart card inserted into a card reader in said station.

9. A method according to claim 7, wherein said authentication includes reading a biometric print via a biometric sensor in said station.

10. An interactive station adapted to (a) be activated from a mobile terminal having a prestored access profile type and located in a cellular mobile network and (b) from time to time scan for the presence of said mobile terminal in a local radio coverage area, said interactive station being arranged to be coupled to a telecommunication network that is coupled to said cellular mobile network, the interactive station comprising:

a display, a storage and processing arrangement for storing mobile terminal access profiles and for causing the prestored access profile that is declared by said mobile terminal to said interactive station through a local radio link without passing through said cellular mobile network for providing said local radio coverage area that is arranged to condition a communication between said interactive station and said mobile station in response to the presence of said mobile terminal in said local radio coverage area being signaled to said interactive station, a radio dialogue arrangement for exchanging data with said mobile terminal over said radio link and for thereby sending a message to said mobile terminal to prompt said mobile terminal to send an identifier of said mobile terminal, and a line interface arranged to be connected to the telecommunication network for sending said mobile terminal identifier to a management arrangement through said telecommunication network, the line interface being arranged for activating said interactive station by the management arrangement and for causing transmission from said management arrangement to said interactive station of functions of said interactive station to be personalized according to a user profile associated with said mobile terminal identifier in response to said management arrangement validating said mobile terminal identifier.

11. A station according to claim 10, including a keypad or a voice recognition arrangement for sending said mobile terminal identifier to the management arrangement.

12. A station according to claim 11, including an adjuster of directivity of an audio source at said interactive station.

13. A station according to claim 10, including an exchanger of data with at least one mobile terminal over said radio link for providing said local radio coverage area.

14. A station according to claim 10, including at least one of a smart card reader and a biometric sensor for authenticating a user of said mobile terminal.

* * * * *